(12) United States Patent
Liu et al.

(10) Patent No.: US 8,520,411 B2
(45) Date of Patent: Aug. 27, 2013

(54) CONTROL METHOD AND CONTROL MODULE FOR CONTROLLING AN ASYMMETRIC DC-DC CONVERTER

(75) Inventors: Jian Liu, Nanjing (CN); Dong Xiang, Nanjing (CN); Xiaoyi Jin, Nanjing (CN); Zhihong Ye, Nanjing (CN)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 323 days.

(21) Appl. No.: 13/105,037

(22) Filed: May 11, 2011

(65) Prior Publication Data
US 2012/0120685 A1 May 17, 2012

(30) Foreign Application Priority Data
Nov. 17, 2010 (CN) .......................... 2010 1 0553743

(51) Int. Cl.
*H02M 3/335* (2006.01)
(52) U.S. Cl.
USPC .......................... 363/21.02; 363/17; 323/272
(58) Field of Classification Search
USPC ................... 363/16–20, 21.02, 21.13, 41, 65, 363/71, 72, 89, 98, 132; 323/222, 224, 266, 323/272, 282–290
See application file for complete search history.

(56) References Cited

U.S. PATENT DOCUMENTS

| 5,539,630 | A * | 7/1996 | Pietkiewicz et al. | 363/17 |
| 6,185,111 | B1 * | 2/2001 | Yoshida | 363/17 |
| 6,483,721 | B2 * | 11/2002 | Terashi | 363/17 |
| 6,927,987 | B2 * | 8/2005 | Farrington et al. | 363/56.02 |

* cited by examiner

*Primary Examiner* — Rajnikant Patel
(74) *Attorney, Agent, or Firm* — Rosenberg, Klein & Lee

(57) ABSTRACT

A control method is provided for controlling an asymmetric DC-DC converter including first and second power switches that are driven respectively by first and second control signals, and a voltage-converting circuit that is operatively associated with the first and second power switches for generating an output signal. The voltage-converting circuit includes a primary coil unit and a secondary coil unit operatively associated therewith for voltage conversion, and including first and second coils that have a turn ratio not equal to one. The control method includes: sampling the output signal to obtain a sample signal corresponding thereto; and generating the first and second control signals, which correspond respectively to first and second duty cycles having a sum of one, based on a comparison between the sample signal and a reference signal such that the first and second power switches are driven in an alternating manner.

10 Claims, 4 Drawing Sheets

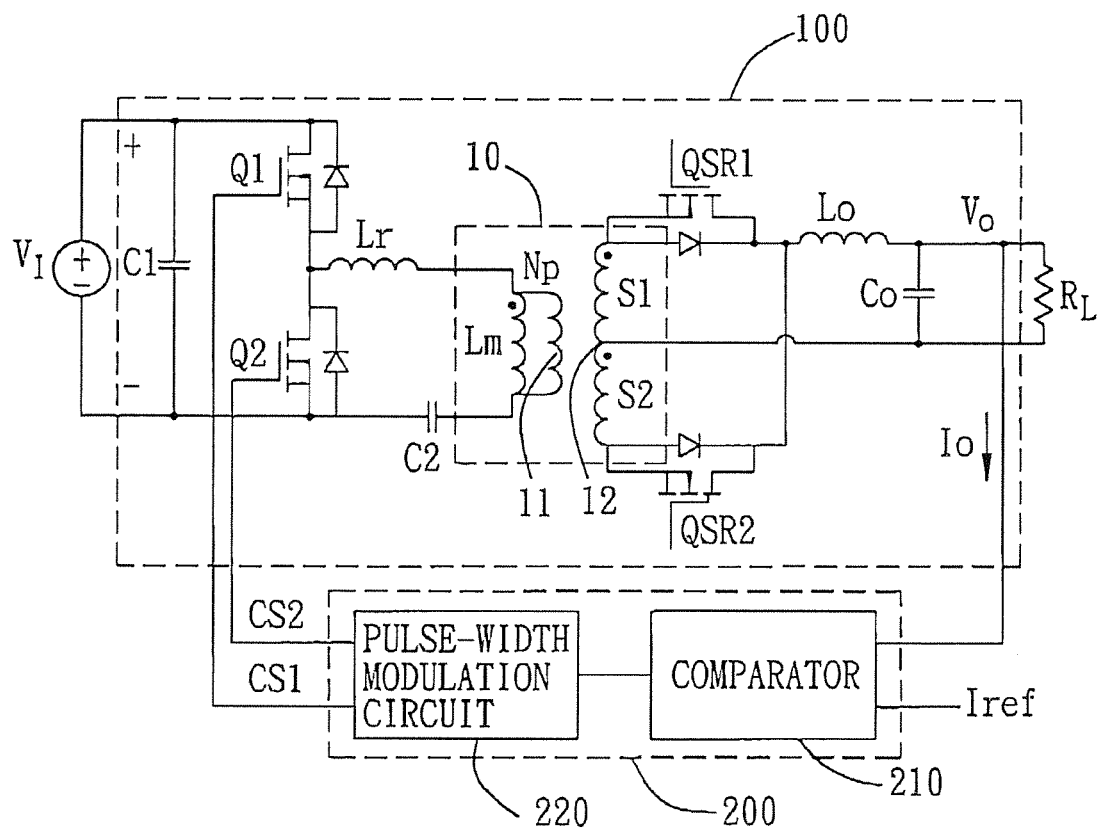
F I G. 3

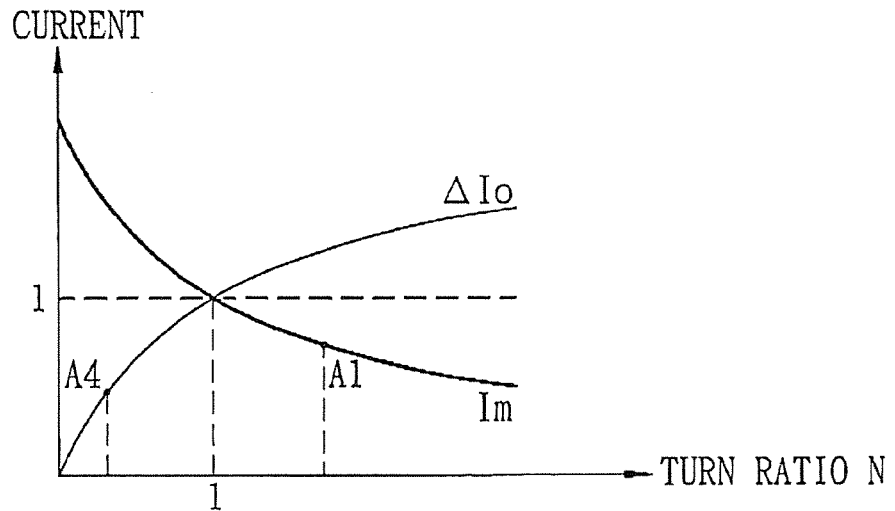
F I G. 4
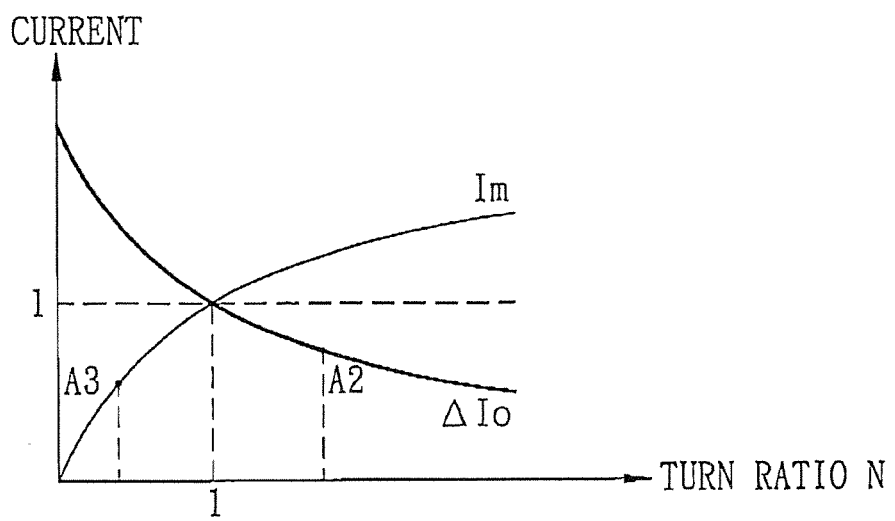
F I G. 5

CONTROL METHOD AND CONTROL MODULE FOR CONTROLLING AN ASYMMETRIC DC-DC CONVERTER

CROSS-REFERENCE TO RELATED APPLICATION

This application claims priority of Chinese Application No. 201010553743.3, filed on November 17, 2010.

BACKGROUND OF THE INVENTION

1. Field of the Invention

The present invention relates to a control method, more particularly to a control method for controlling an asymmetric DC-DC converter.

2. Description of the Related Art

Generally, asymmetric DC-DC converters adopt complementary control techniques and are characterized by advantages such as low switching voltage stress and relatively simple structure. The asymmetric DC-DC converters, with the use of synchronous rectification techniques, are able to reduce loss attributed to rectification processes, thereby improving the conversion efficiency. The asymmetric DC-DC converters are therefore suitable for use at high frequencies.

Shown in FIG. 1 is a conventional asymmetric half-bridge DC-DC converter 900, which, in comparison with conventional symmetric converters, has first and second power switches Q1, Q2 driven in an alternating manner by respective signals that are complementary to each other. That is to say, when one of the first and second power switches Q1, Q2 is not driven, the other of the first and second power switches Q1, Q2 is driven. However, such an asymmetric complementary control is characterized by the drawback of presence of direct current biasing in the asymmetric half-bridge DC-DC converter 900. When loading of a load $R_L$, increases, a biasing current that is generated by the asymmetric half-bridge DC-DC converter 900 increases. In order to reduce the impact of the biasing current, an inductance of an inductor Lm must be reduced, or larger magnetic cores (not shown) must be used. Such an approach, however, may have a significant adverse impact upon the conversion efficiency and may reduce density of the output power. On the other hand, although adopting an asymmetric turn ratio may reduce the biasing current, the ripple current of an output inductor Lo may consequently be increased. Under light loading, an inductor current that flows in a reverse direction will cause a voltage peak of a synchronous rectifier to increase, which reduces reliability of the asymmetric half-bridge DC-DC converter 900.

Therefore, how to implement an asymmetric DC-DC converter that is able to adapt to different loadings and that exhibits less biasing currents and ripple currents has been a subject of improvement in the industry.

SUMMARY OF THE INVENTION

Therefore, an object of the present invention is to provide a control method capable of alleviating the aforesaid drawback of the prior art.

Accordingly, a control method of the present invention is for controlling an asymmetric DC-DC converter that generates an output signal, and that includes first and second power switches and a voltage-converting circuit cooperating with the first and second power switches for generating the output signal. The first and second power switches are driven respectively by first and second control signals. The voltage-converting circuit includes a primary coil unit and a secondary coil unit that is operatively associated with the primary coil unit for voltage conversion, and that includes first and second coils having a turn ratio not equal to one.

The control method includes the steps of: a) sampling the output signal to obtain a sample signal corresponding thereto; and b) generating the first and second control signals based on a comparison between the sample signal and a reference signal such that the first and second power switches are driven in an alternating manner, each of the first and second control signals corresponding to a respective one of first and second duty cycles that have a sum of one.

Another object of the present invention is to provide a control module capable of alleviating the aforesaid drawback of the prior art.

Accordingly, a control module of the present invention is adapted to receive a reference signal and is adapted to be coupled to an asymmetric DC-DC converter for controlling operation thereof with reference to the reference signal. The asymmetric DC-DC converter is operable to generate an output signal, and includes first and second power switches and a voltage-converting circuit that cooperates with the first and second power switches for generating the output signal. The first and second power switches are driven respectively by first and second control signals. The voltage-converting circuit includes a primary coil unit and a secondary coil unit that is operatively associated with the primary coil unit for voltage conversion, and that includes first and second coils having a turn ratio not equal to one.

The control module includes: a comparator adapted to receive the reference signal, adapted to be coupled to the asymmetric DC-DC converter, and configured to sample the output signal to obtain a sample signal corresponding thereto, and to perform a comparison between the sample signal and the reference signal; and a pulse-width modulation circuit coupled to the comparator, and configured to generate the first and second control signals based on the comparison between the sample signal and the reference signal such that the first and second power switches are driven in an alternating manner, each of the first and second control signals corresponding to a respective one of first and second duty cycles that have a sum of one.

BRIEF DESCRIPTION OF THE DRAWINGS

Other features and advantages of the present invention will become apparent in the following detailed description of the preferred embodiment with reference to the accompanying drawings, of which:

FIG. 3 is a schematic circuit block diagram to illustrate the preferred embodiment applied to a conventional asymmetric DC-DC converter;

FIG. 4 is a plot of current vs. turn ratio to illustrate a relationship between biasing current of a voltage-converting circuit and ripple current of an output inductor Lo when first and second control signals CS1, CS2 generated by the control module correspond to first and second duty cycles D, D', respectively; and FIG. 5 is a plot of current vs. turn ratio to illustrate a relationship between biasing current of a voltage-converting circuit and ripple current of an output inductor Lo when the first and second control signals CS1, CS2 generated by the control module correspond to the second and first duty cycles D', D, respectively.

DETAILED DESCRIPTION OF THE PREFERRED EMBODIMENT

Figure 1:
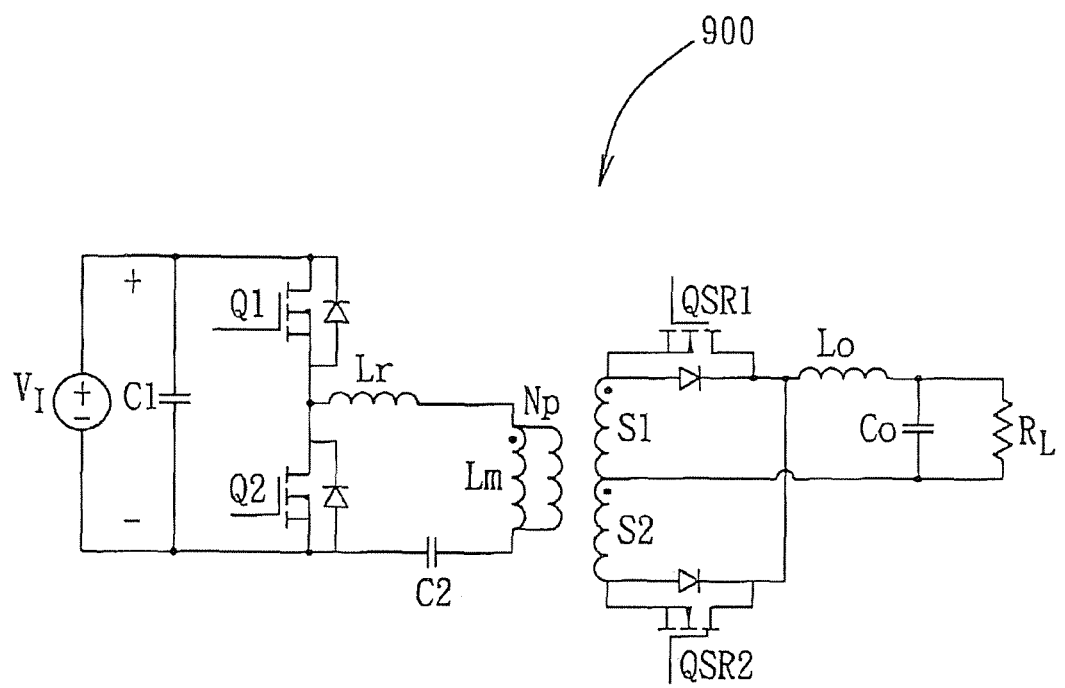
FIG. 1 is a schematic circuit diagram to illustrate a conventional asymmetric half-bridge DC-DC converter.
Figure 2:
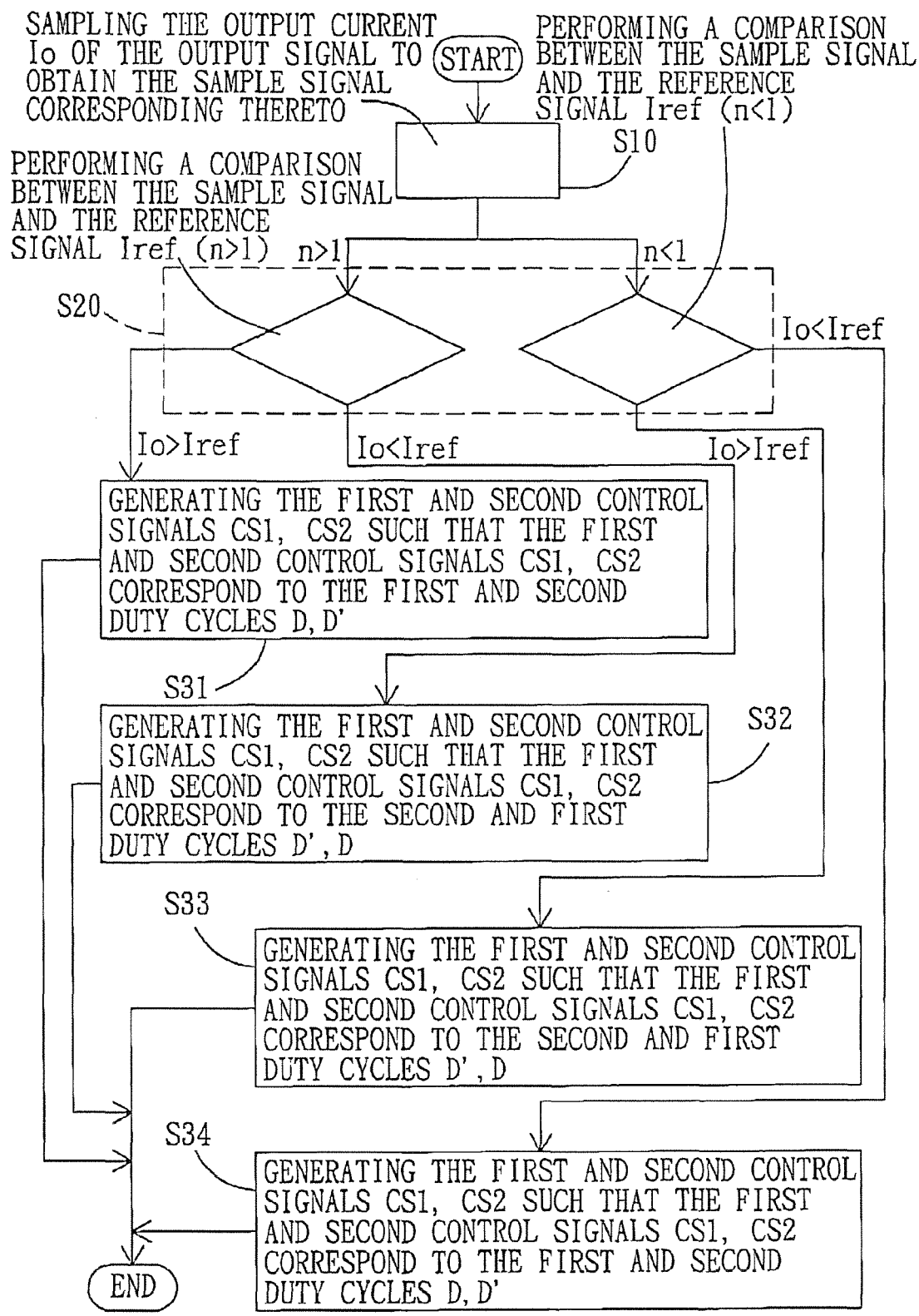
FIG. 2 is a flowchart to illustrate the preferred embodiment of a control method according to the present invention.

Shown in FIG. 2 is a flowchart to illustrate the preferred embodiment of a control method according to the present invention. Shown in FIG. 3 is a schematic diagram to illustrate the preferred embodiment of a control module 200, according to the present invention, that is adapted to be coupled to an asymmetric DC-DC converter 100, that is adapted to receive a reference signal Iref, and that is configured to perform the control method for controlling operation of the asymmetric DC-DC converter 100 with reference to the reference signal Iref. The asymmetric DC-DC converter 100 is applicable to such as desktop computers, workstation computers, gaming consoles, liquid crystal display monitors, and distributed power systems. Furthermore, in this embodiment, the asymmetric DC-DC converter 100 is an asymmetric half-bridge DC-DC converter including first and second power switches Q1, Q2 and a voltage-converting circuit 10 that cooperates with the first and second power switches Q1, Q2 for generating an output signal. The first and second power switches Q1, Q2 are driven by first and second control signals CS1, CS2, respectively. In this embodiment, the output signal has an output voltage Vo and an output current Io, and is provided to a load $R_L$. The voltage-converting circuit 10 is a voltage-transferring circuit, and includes a primary coil unit 11, and a secondary coil unit 12 that is operatively associated with the primary coil 11 for voltage conversion and that includes first and second coils S1, S2 having a turn ratio not equal to one, the turn ratio being a ratio of the number of turns of the first coil S1 to the number of turns of the second coil S2. In other embodiments, the asymmetric DC-DC converter 100 may be an asymmetric full-bridge DC-DC converter.

The control module 200 includes a comparator 210 and a pulse-width modulation (PWM) circuit 220. The comparator 210 is adapted to be coupled electrically to an output terminal of the asymmetric DC-DC converter 100, and is configured to sample the output current Io of the output signal so as to obtain a sample signal corresponding to the output current Io, and to perform a comparison between the sample signal and the reference signal Iref.

The PWM circuit 220 is coupled to the comparator 210, is configured to generate the first and second control signals CS1, CS2 based on the comparison performed by the comparator 210, such that the first and second power switches Q1, Q2 are driven in an alternating manner. Each of the first and second control signals CS1, Cs2 corresponds to a respective one of first and second duty cycles D, D' that have a sum of one.

FIG. 4 is a plot of current vs. turn ratio to illustrate a relationship between biasing current Im of the voltage-converting circuit 10 and ripple current ΔIo of an output inductor Lo when the first and second control signals CS1, CS2 correspond to the first and second duty cycles D, D', respectively. FIG. 5 is a plot of current vs. turn ratio to illustrate a relationship between the biasing current Im of the voltage-converting circuit 10 and the ripple current ΔIo of the output inductor Lo when the first and second control signals CS1, CS2 correspond to the second and first duty cycles D', D, respectively. The horizontal axis of each of FIGS. 4 and 5 represents the turn ratio "n" between the first and second coils S1, S2 of the secondary coil unit 12. It can be understood from FIGS. 4 and 5 that the biasing current Im and the ripple current ΔIo vary with the turn ratio "n". That is to say, at a given turn ratio, the biasing current Im and the ripple current ΔIo may be varied by varying the duty cycles to which the first and second control signals CS1, CS2 correspond, respectively.

Referring again to FIGS. 2 and 3, steps performed by the control module 200 to generate the first and second control signals CS1, CS2 in a manner that the biasing current Im and the ripple current ΔIo are reduced are described hereinafter.

In step S10, the comparator 210 is configured to sample the output current Io of the output signal to obtain the sample signal corresponding thereto.

In step S20, the comparator 210 is configured to perform the comparison between the sample signal and the reference signal Iref.

If the turn ratio is greater than one, and the comparison indicates the output current Io as having a magnitude larger than that of the reference signal Iref, the asymmetric DC-DC converter 100 is under heavy loading and the control module 200 is configured to proceed to step S31 from step S20, in which the PWM circuit 220 is configured to generate the first and second control signals CS1, CS2 such that the first and second control signals CS1, CS2 correspond to the first and second duty cycles D, D' (marked by point "A1" in FIG. 4), thereby reducing the biasing current Im of the voltage-converting circuit 10.

If the turn ratio is greater than one, and the comparison indicates the output current Io as having a magnitude smaller than that of the reference signal Iref, the asymmetric DC-DC converter 100 is under light loading and the control module 200 is configured to proceed to step S32 from step S20, in which the PWM circuit 220 is configured to generate the first and second control signals CS1, CS2 such that the first and second control signals CS1, CS2 correspond to the second and first duty cycles D',D (marked by point "A2" in FIG. 5), thereby reducing the ripple current ΔIo of the output inductor Lo.

If the turn ratio is smaller than one, and the comparison indicates the output current Io as having a magnitude larger than that of the reference signal Iref, the asymmetric DC-DC converter 100 is under heavy loading and the control module 200 is configured to proceed to step S33 from step S20, in which the PWM circuit 220 is configured to generate the first and second control signals CS1, CS2 such that the first and second control signals CS1, CS2 correspond to the second and first duty cycles D',D (marked by point "A3" in FIG. 5), thereby reducing the biasing current Im of the voltage-converting circuit 10.

If the turn ratio is smaller than one, and the comparison indicates the output current Io as having a magnitude smaller than that of the reference signal Iref, the asymmetric DC-DC converter 100 is under light loading and the control module 200 is configured to proceed to step S34 from step S20, in which the PWM circuit 220 is configured to generate the first and second control signals CS1, CS2 such that the first and second control signals CS1, CS2 correspond to the first and second duty cycles D, D' (marked by point "A4" in FIG. 4), thereby reducing the ripple current ΔIo of the output inductor Lo.

Therefore, together with the control module 200, the asymmetric DC-DC converter 100 may be characterized by reduced dimensions, reduced ripple currents and biasing currents, and improved density of output power. Furthermore, low switching voltage stress and improved reliability may be achieved if the voltage-converting circuit 10 is configured for synchronous rectification.

It is to be noted that, in other embodiments, the control module 200 may sample the output voltage Vo of the asymmetric DC-DC converter 100 instead of the output current Io of the same. Furthermore, the turn ratio "n" may chosen modified for adapting the control module 200 to other asymmetric DC-DC converters, as long as the turn ratio "n" is not equal to one.

In summary, the control module 200, through sampling the output current Io, is able to generate the first and second control signals CS1, CS2 with appropriate duty cycles such that ripple current and biasing current may be reduced, regardless of the loading state of the asymmetric DC-DC converter 100.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A control method for controlling an asymmetric DC-DC converter that generates an output signal, and that includes first and second power switches and a voltage-converting circuit cooperating with the first and second power switches for generating the output signal, the first and second power switches being driven respectively by first and second control signals, the voltage-converting circuit including a primary coil unit and a secondary coil unit that is operatively associated with the primary coil unit for voltage conversion, and that includes first and second coils having a turn ratio not equal to one, said control method comprising the steps of:
    a) sampling the output signal to obtain a sample signal corresponding thereto; and
    b) generating the first and second control signals based on a comparison between the sample signal and a reference signal such that the first and second power switches are driven in an alternating manner, each of the first and second control signals corresponding to a respective one of first and second duty cycles that have a sum of one.

2. The control method as claimed in claim 1, wherein, when the turn ratio is greater than one, and the comparison between the sample signal and the reference signal indicates the output signal as having a magnitude larger than that of the reference signal, the first and second control signals correspond to the first and second duty cycles, respectively.

3. The control method as claimed in claim 2, wherein, when the turn ratio is greater than one, and the comparison between the sample signal and the reference signal indicates the output signal as having a magnitude smaller than that of the reference signal, the first and second control signals correspond to the second and first duty cycles, respectively.

4. The control method as claimed in claim 1, wherein, when the turn ratio is smaller than one, and the comparison between the sample signal and the reference signal indicates the output signal as having a magnitude larger than that of the reference signal, the first and second control signals correspond to the second and first duty cycles, respectively.

5. The control method as claimed in claim 4, wherein, when the turn ratio is smaller than one, and the comparison between the sample signal and the reference signal indicates the output signal as having a magnitude smaller than that of the reference signal, the first and second control signals correspond to the first and second duty cycles, respectively.

6. A control module adapted to receive a reference signal and adapted to be coupled to an asymmetric DC-DC converter for controlling operation thereof with reference to the reference signal, the asymmetric DC-DC converter being operable to generate an output signal, and including first and second power switches and a voltage-converting circuit that cooperates with the first and second power switches for generating the output signal, the first and second power switches being driven respectively by first and second control signals, the voltage-converting circuit including a primary coil unit and a secondary coil unit that is operatively associated with the primary coil unit for voltage conversion, and that includes first and second coils having a turn ratio not equal to one, said control module comprising:
    a comparator adapted to receive the reference signal, adapted to be coupled to the asymmetric DC-DC converter, and configured to sample the output signal to obtain a sample signal corresponding thereto, and to perform a comparison between the sample signal and the reference signal; and
    a pulse-width modulation circuit coupled to said comparator, and configured to generate the first and second control signals based on the comparison between the sample signal and the reference signal such that the first and second power switches are driven in an alternating manner, each of the first and second control signals corresponding to a respective one of first and second duty cycles that have a sum of one.

7. The control module as claimed in claim 6, wherein, when the turn ratio is greater than one, and the comparison between the sample signal and the reference signal indicates the output signal as having a magnitude larger than that of the reference signal, the first and second control signals correspond to the first and second duty cycles, respectively.

8. The control module as claimed in claim 7, wherein, when the turn ratio is greater than one, and the comparison between the sample signal and the reference signal indicates the output signal as having a magnitude smaller than that of the reference signal, the first and second control signals correspond to the second and first duty cycles, respectively.

9. The control module as claimed in claim 6, wherein, when the turn ratio is smaller than one, and the comparison between the sample signal and the reference signal indicates the output signal as having a magnitude larger than that of the reference signal, the first and second control signals correspond to the second and first duty cycles, respectively.

10. The control method as claimed in claim 9, wherein, when the turn ratio is smaller than one, and the comparison between the sample signal and the reference signal indicates the output signal as having a magnitude smaller than that of the reference signal, the first and second control signals correspond to the first and second duty cycles, respectively.

* * * * *